(12) United States Patent
Johnson

(10) Patent No.: US 8,971,007 B2
(45) Date of Patent: Mar. 3, 2015

(54) ELECTRICAL ENERGY SAVING SYSTEM

(75) Inventor: Jerry B. Johnson, Pleasant View, TN (US)

(73) Assignee: Black Hawk Energy Products, Ashland, TN (US)

( * ) Notice: Subject to any disclaimer, the term of this patent is extended or adjusted under 35 U.S.C. 154(b) by 591 days.

(21) Appl. No.: 12/579,030

(22) Filed: Oct. 14, 2009

(65) Prior Publication Data

US 2010/0091423 A1 Apr. 15, 2010

Related U.S. Application Data

(60) Provisional application No. 61/196,036, filed on Oct. 14, 2008.

(51) Int. Cl.
| | |
|---|---|
| *H01C 7/12* | (2006.01) |
| *H02H 1/00* | (2006.01) |
| *H02H 1/04* | (2006.01) |
| *H02H 3/22* | (2006.01) |
| *H02H 9/06* | (2006.01) |
| *H02H 9/04* | (2006.01) |
| *H02J 3/18* | (2006.01) |

(52) U.S. Cl.
CPC .............. *H02H 9/041* (2013.01); *H02J 3/1821* (2013.01)
USPC ........................................................ 361/118

(58) Field of Classification Search
USPC .................. 361/129, 120, 56, 91.1, 111–118; 307/105, 108
See application file for complete search history.

(56) References Cited

U.S. PATENT DOCUMENTS

| | | | | |
|---|---|---|---|---|
| 3,546,572 | A | * 12/1970 | Specht et al. | ................. 361/111 |
| 4,152,743 | A | * 5/1979 | Comstock | ....................... 361/56 |
| 4,410,807 | A | * 10/1983 | Buffington | ...................... 307/68 |
| 4,616,286 | A | * 10/1986 | Breece | ............................ 361/56 |
| 4,922,366 | A | 5/1990 | Van Dick | |
| 5,157,572 | A | * 10/1992 | Bird | ............................... 361/56 |
| 6,034,611 | A | * 3/2000 | Brooks et al. | ................ 340/647 |
| 6,055,147 | A | * 4/2000 | Jeffries et al. | ................ 361/103 |
| 2008/0151461 | A1 | * 6/2008 | Kauffman | ..................... 361/119 |

* cited by examiner

*Primary Examiner* — Thienvu Tran
*Assistant Examiner* — Christopher Clark
(74) *Attorney, Agent, or Firm* — Hovey Williams LLP

(57) ABSTRACT

A system for conditioning the three-phase alternating current electric power, including a first phase, a second phase, a third phase, and a neutral line, supplied to a load includes a plurality of first surge arresters, a plurality of second surge arresters, a plurality of third surge arresters, a three-phase surge suppressor, and a plurality of capacitors. The surge arresters minimize the amount by which the voltage between two phases and the neutral line exceeds a rated value. The three-phase surge suppressor minimizes the amount by which the voltage between the three phases and the neutral line exceeds a rated value. The capacitors minimize the amount by which the voltage between two phases falls below a rated value.

16 Claims, 3 Drawing Sheets

ELECTRICAL ENERGY SAVING SYSTEM

RELATED APPLICATION

This nonprovisional patent application claims priority benefit, with regard to all common subject matter, of earlier-filed U.S. provisional patent application titled "Electrical energy saving device that stabilizes voltage, reduces heat, and amperage load in an alternating current system", Ser. No. 61/196,036, filed Oct. 14, 2008. The identified earlier-filed application is hereby incorporated by reference in its entirety into the present application.

BACKGROUND OF THE INVENTION

1. Field of the Invention

Embodiments of the present invention relate to methods and systems for supplying alternating current (AC) electric power to a load. More particularly, embodiments of the present invention relate to methods and systems that condition the power supplied to a load from an AC electric power supply in order to save electrical energy.

2. Description of the Related Art

AC electric power supplied from a utility company may include transient spikes or surges in the line voltage, wherein the voltage level is greater than it should be, as a result of lightning or electrical storm activity or various other phenomena. In addition, the line voltage may experience droops or sags, wherein the voltage level is less than it should be, as a result of increased loading of the power supply. These variations in the level of the voltage supplied to a load may lead to additional wear on devices connected to the power supply and increased electrical energy consumed in the form of additional heat produced in the electrical system wiring and additional start-up current load.

SUMMARY OF THE INVENTION

Embodiments of the present invention solve the above-mentioned problems and provide a distinct advance in the art of supplying alternating current (AC) electric power to a load. More particularly, embodiments of the invention provide methods and systems that condition the power supplied to a load from an AC electric power supply in order to save electrical energy.

One embodiment of the invention is a system for conditioning the three phase alternating current electric power, including a first phase, a second phase, a third phase, and a neutral line, supplied to a load. The system broadly comprises a plurality of first surge arresters, a plurality of second surge arresters, a plurality of third surge arresters, a three-phase surge suppressor, and a plurality of capacitors. The first surge arresters may be coupled to the first phase, the second phase, and the neutral line and may minimize the amount by which the voltage between two phases and the neutral line exceeds a rated value. The second surge arresters may be coupled to the second phase, the third phase, and the neutral line and may minimize the amount by which the voltage between two phases and the neutral line exceeds the rated value. The third surge arresters may be coupled to the first phase, the third phase, and the neutral line and may minimize the amount by which the voltage between two phases and the neutral line exceeds the rated value. The three phase surge suppressor may be coupled to the first phase, the second phase, the third phase, and the neutral line and may minimize the amount by which the voltage between the three phases and the neutral line exceeds the rated value. The capacitors may include a first capacitor coupled to the first phase and the second phase, a second capacitor coupled to the second phase and the third phase, and a third capacitor coupled to the first phase and the third phase, and may minimize the amount by which the voltage between two phases falls below the rated value.

Another embodiment of the invention is a system for conditioning a single phase alternating current electric power, including a first phase, a second phase, and a neutral line, supplied to a load. The system broadly comprises a plurality of first surge arresters, a single phase surge suppressor, and a capacitor. The first surge arresters may be coupled to the first phase, the second phase, and the neutral line and configured to minimize the amount by which the voltage between the first phase and the second phase exceeds a rated value by presenting a low impedance to the neutral line when the voltage between the first phase and the second phase exceeds the rated value. The single phase surge suppressor may be coupled to the first phase, the second phase, and the neutral line and configured to minimize the amount by which the voltage between the two phases and the neutral line exceeds a rated value by presenting the low impedance to the neutral line when either the first phase or the second phase exceeds the rated value. The capacitor may be coupled to the first phase and the second phase and configured to minimize the amount by which the voltage between the first phase and the second phase falls below the rated value.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
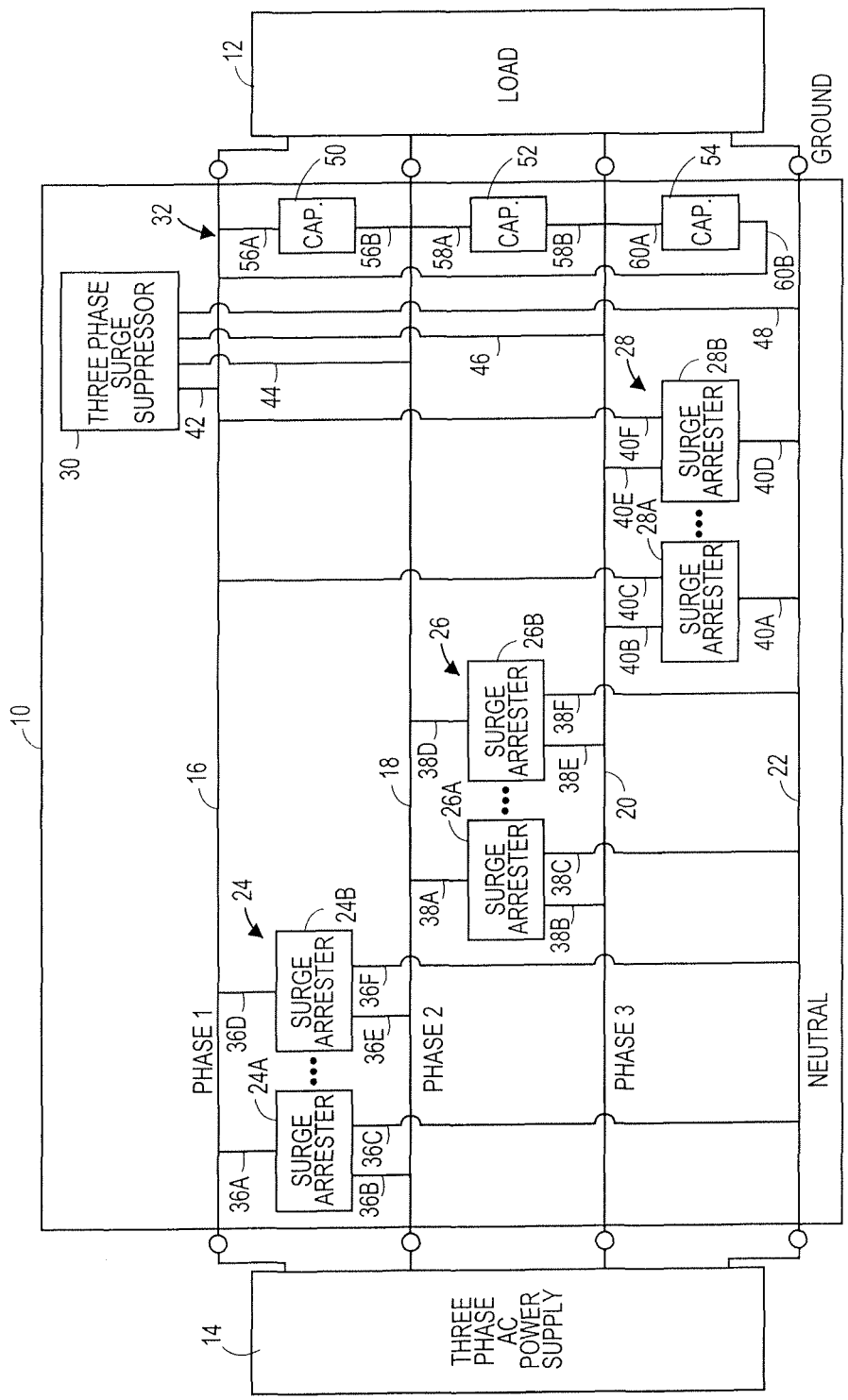
FIG. 1 is a block diagram of a system constructed in accordance with at least one embodiment of the present invention for conditioning a three phase alternating current electric power supplied to a load.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

A system 10 constructed in accordance with various embodiments of the present invention for conditioning the power supplied to a load 12 from an alternating current (AC) electric power supply 14 is shown in FIG. 1. The electric power supply 14, in various embodiments, may be a three-phase electric power source and may represent the electric power supplied from a utility company, a generator, or similar source. The electric power supply 14 may present a first phase 16, a second phase 18, a third phase 20, and a neutral line 22, wherein the angular difference of the voltage between any two phases is 120 degrees, as known to those skilled in the art. The load 12 may be any commonly implemented load that draws electric power such as motors, compressors, turbines, lighting, heating, combinations thereof, or other industrial, commercial, or residential loads. The load 12 may be balanced between the first phase 16, the second phase 18, and the third phase 20, or the load 12 may be unbalanced.

The system 10 may broadly comprise a first set of surge arresters 24, a second set of surge arresters 26, a third set of surge arresters 28, a three-phase surge suppressor 30, and a plurality of capacitors 32. The system 10 is generally positioned between the electric power supply 14 and the load 12, and may be utilized with existing electric power supply 14 structures in an industrial, commercial, or residential setting. Or, the system 10 may be integrated into a new residence or other building. In embodiments for usage with a new electric power supply 14 structure, the components of the system 10 may be incorporated in an electric power distribution control panel. In other embodiments for usage with an existing residence or building, the system 10 may be enclosed in a housing or insulated box, typically in close proximity to the electric power delivery point, such as a wiring panel, for a facility, building, or residence. The housing may be designed to output four wires that couple with each of the phases 16, 18, 20 and the neutral line 22 of the existing electric power wiring.

In one embodiment, the first set surge arresters 24 may include two surge arresters 24a, 24b, as depicted in FIG. 1. The surge arresters 24a, 24b may include surge suppressors or lightning arresters or other devices that operate on the general principle of presenting an open circuit or high impedance between two ports when the voltage between the two ports is less than or equal to a given value and presenting a short circuit or low impedance between the two ports when the voltage therebetween exceeds the given value. In various embodiments, one of the ports may be coupled to one of the phases 16, 18, 20 and the other port may be coupled to the neutral line. The surge arresters 24a, 24b may be generally passive elements and may include such components as metal-oxide varistors or the like.

In various embodiments, the surge arrester 24a may present a single phase, two-pole, three-wire configuration, and may include a first port 36a, a second port 36b, and a ground port 36c. An example of the surge arrester 24a may include the AG2401C from Intermatic of Spring Grove, Ill. The two-pole surge arrester 24a may monitor the voltage between two set of ports independently—between the first port 36a and the ground port 36c, and between the second port 36b and the ground port 36c. Thus, the surge arrester 24a may present a low impedance between the first port 36a and the ground port 36c if the voltage therebetween exceeds a rated value. Likewise, the surge arrester 24a may present a low impedance between the second port 36b and the ground port 36c if the voltage therebetween exceeds a rated value. The surge arrester 24a may have an additional mode of operation, wherein the surge arrester 24a presents a low impedance from either or both of the first port 36a and the second port 36b to the ground port 36c when the voltage between the first port 36a and the second port 36b exceeds a rated value. The surge arrester 24b may be substantially similar to the surge arrester 24a and may include a first port 36d, a second port 36e, and a ground port 36f.

The surge arrester 24a may further include an electric current rating which corresponds to the rated amount of current that can be handled by the surge arrester 24a. Thus, the number of surge arresters 24a, 24b, etc. included in the plurality of first surge arresters 24 is related to the total amount of current the load 12 is expected to draw divided by the current rating of each surge arrester 24a, 24b. For example, if the total current drawn by the load 12 is 200 amperes (A) and each surge arrester 24a, 24b is rated for 40 A, then there may be 200 A/40 A=5 surge arresters 24a, 24b, etc. included in the plurality of first surge arresters 24. In some embodiments, it may be possible to include surge arresters 24a, 24b of different current ratings as long as the sum of the current ratings for all the surge arresters 24a, 24b, etc. is equal to or greater than the total current drawn by the load 12.

The surge arrester 24a may be oriented in the system 10 such that the first port 36a is coupled to the first phase 16, the second port 36b is coupled to the second phase 18, and the ground port 36c is coupled to the neutral line 22. The surge arrester 24b may be oriented in the system 10 such that the first port 36d is coupled to the first phase 16, the second port 36e is coupled to the second phase 18, and the ground port 36f is coupled to the neutral line 22.

The second set of surge arresters 26 may also include two surge arresters 26a, 26b, which may function substantially the same way as the surge arresters 24a, 24b described above. The surge arrester 26a may include a first port 38a, a second port 38b, and a ground port 38c. The surge arrester 26b may include a first port 38d, a second port 38e, and a ground port 38f. The surge arrester 26a may be oriented in the system 10 such that the first port 38a is coupled to the second phase 18, the second port 38b is coupled to the third phase 20, and the ground port 38c is coupled to the neutral line 22. The surge arrester 26b may be oriented in the system 10 such that the first port 38d is coupled to the second phase 18, the second port 38e is coupled to the third phase 20, and the ground port 38f is coupled to the neutral line 22.

The third set of surge arresters 28 may also include two surge arresters 28a, 28b, which may function substantially the same way as the surge arresters 24a, 24b described above. The surge arrester 28a may include a first port 40a, a second port 40b, and a ground port 40c. The surge arrester 28b may include a first port 40d, a second port 40e, and a ground port 40f. The surge arrester 28a may be oriented in the system 10 such that the first port 40a is coupled to the second phase 18, the second port 40b is coupled to the third phase 20, and the ground port 40c is coupled to the neutral line 22. The surge arrester 28b may be oriented in the system 10 such that the first port 40d is coupled to the second phase 18, the second port 40e is coupled to the third phase 20, and the ground port 40f is coupled to the neutral line 22.

The three-phase surge suppressor 30 may include surge suppressors, surge protectors, surge arresters, combinations thereof, and the like. The three-phase surge suppressor 30 may be a generally passive element and may include such components as metal-oxide varistors or the like. The three-phase surge suppressor 30 may include a first port 42, a second port 44, a third port 46, and a ground port 48. An example of the three-phase surge suppressor 30 includes the 120 Volt AC (VAC) transient voltage surge suppressor from Innovative Technology of Moon Township, Pa. In a similar fashion to the surge arrester 34 discussed above, the three-phase surge suppressor 30 may present a low impedance between the first port 42 and the ground port 48 if the voltage therebetween exceeds a rated value. Likewise, the three-phase surge suppressor 30 may present a low impedance between the second port 44 and the ground port 48 if the voltage therebetween exceeds a rated value, and may present a low impedance between the third port 46 and the ground port 48 if the voltage therebetween exceeds a rated value. The three-phase surge suppressor 30 may be oriented in the system 10 such that the first port 42 is coupled to the first phase 16, the second port 44 is coupled to the second phase 18, the third port 46 is coupled to the third phase 20, and the ground port 48 is coupled to the neutral line 22.

The plurality of capacitors 32 generally maintains the voltage level of any of the first phase 16, the second phase 18, or the third phase 20 with respect to one another whenever the load 12 changes, such as whenever a load is added as may occur during the starting of an electric motor. The plurality of capacitors 32 may also serve to correct the power factor by reducing the reactive power consumed by highly inductive loads such as electric motors. The plurality of capacitors 32 may include many types of capacitors such as electrolytic or polypropylene dielectric capacitors.

The plurality of capacitors 32 may include at least a first capacitor 50, a second capacitor 52, and a third capacitor 54. In various embodiments, the three capacitors may be substantially similar. Further, the first capacitor 50, the second capacitor 52, and the third capacitor 54 may include one or more physical capacitors coupled in parallel. Examples of the first capacitor 50, the second capacitor 52, and the third capacitor 54 may include the HID 4446-P 280 VAC, 28 microfarad capacitor from Aerovox Corporation of New Bedford, Mass.

First capacitor 50 may include a first terminal 56a coupled to the first phase 16 and a second terminal 56b coupled to the second phase 18. Second capacitor 52 may include a first terminal 58a coupled to the second phase 18 and a second terminal 58b coupled to the third phase 20. Third capacitor 54 may include a first terminal 60a coupled to the third phase 20 and a second terminal 60b coupled to the first phase 16.

Figure 2:
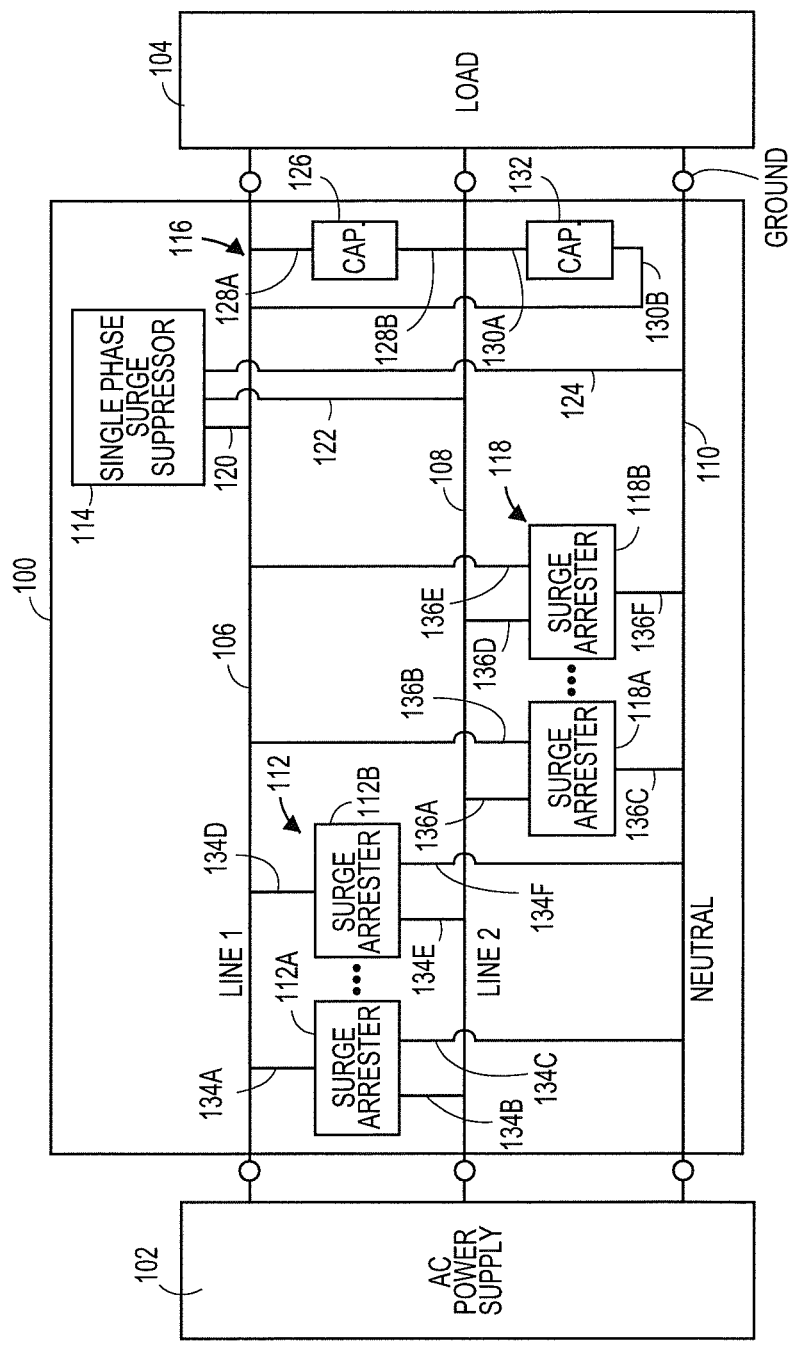
FIG. 2 is a block diagram of a system constructed in accordance with another embodiment of the invention for conditioning a single phase alternating current electric power supplied to a load.

A second embodiment of the system 100 that may be utilized with a single phase electric power supply 102 is shown in FIG. 2. The electric power supply 102 may be similar to that which is delivered to a residence or small business wherein 120 VAC is supplied to the load 104. The electric power supply may include a first line 106, a second line 108, and a neutral line 110. Typical loads 104 may include common household or business items such as small appliances, lighting, entertainment devices, computing devices, combinations thereof, and the like. Similar to system 10 described above, system 100 may be enclosed in a housing or insulated box, typically in close proximity to the electric power delivery point for the house or business. Alternatively, the components of the system 100 may be incorporated in an electric power distribution control panel. The system 100 may broadly comprise a first set of surge arresters 112, a single-phase surge suppressor 114, and a plurality of capacitors 116.

The first set of surge arresters 112 may perform a substantially similar function as the first surge arresters 24 described above, wherein the voltage between the first line 106 and the second line 108 is monitored, or the voltage between either line 106, 108 and the neutral line 110 is monitored. The first set of surge arresters 112 may include two surge arresters 112a, 112b. The surge arresters 112a, 112b may provide a low impedance path to the neutral line 110 if the voltage between the first line 106 and the second line 108 exceeds a rated value, or if the voltage between either line 106, 108 and the neutral line 110 exceeds a rated value.

Like the surge arresters 24a, 24b discussed above, the surge arresters 112a, 112b may have an electric current rating which may be used to determine the number of surge arresters 112a, 112b, etc. included in the first set of surge arresters 112. For example, if the surge arresters 112a, 112b has a current rating of 10 A and the total amount of current drawn by the load 104 is 50 A, then the first set of surge arresters 112 may include five surge arresters 112a, 112b, etc.

The surge arrester 112a includes a first port 134a coupled to the first line 106, a second port 134b coupled to the second line 108, and a ground port 134c coupled to the neutral line 110. The surge arrester 112b includes a first port 134d coupled to the first line 106, a second port 134e coupled to the second line 108, and a ground port 134f coupled to the neutral line 110.

In various embodiments, the system 100 may further include a second set of surge arresters 118, including surge arresters 118a, 118b, that are substantially similar to the surge arresters 112. The surge arrester 116a includes a first port 136a coupled to the second line 108, a second port 136b coupled to the first line 106, and a ground port 136c coupled to the neutral line 110. The surge arrester 118b includes a first port 136d coupled to the second line 108, a second port 136e coupled to the first line 106, and a ground port 136f coupled to the neutral line 110.

The single-phase surge suppressor 114 may include surge suppressors, surge protectors, surge arresters, combinations thereof, and the like. The single-phase surge suppressor 114 may be a generally passive element and may include such components as metal-oxide varistors or the like. The single-phase surge suppressor 114 may include a first port 120, a second port 122, and a ground port 124. The single-phase surge suppressor 114 may provide a low impedance to the ground port 124 if the voltage between the first port 120 and the second port 122 exceeds a rated value, or if the voltage between either port 120, 122 and the ground port 124 exceeds a rated value. The single-phase surge suppressor 114 may be oriented in the system 100 such that the first port 120 is coupled to the first line 106, the second port 122 is coupled to the second line 108, and the ground port 124 is coupled to the neutral line 110.

The plurality of capacitors 116 generally provides a substantially similar function to the plurality of capacitors 32 above, wherein the capacitors 126, 132 maintain the voltage level between the first line 106 and the second line 108 and may provide power factor correction of the electric power supply 102. The plurality of capacitors 116 may include at least a first capacitor 126, which, like the first capacitor 50, includes a first terminal 128a and a second terminal 128b. The first terminal 128a may be coupled to the first line 106, and the second terminal 128b may be coupled to the second line 108. In various embodiments, the plurality of capacitors 116 may also include a second capacitor 132, with a first terminal 130a coupled to the second line 108 and a second terminal 130b coupled to the first line 106.

The applicant believes that the systems 10, 100: elevate and stabilize voltage from the electric power supply 14, 102; reduce electric power supply 14, 102 line voltage drops when the demand from the load 12, 104 increases; balance the voltage between the phases 16, 18, 20 and lines 106, 108;

reduce reactive energy loss; reduce demand loads and spikes on an electric power grid to which the systems 10, 100 may be connected; reduce the total demand on the electric power grid to which the systems 10, 100 may be connected; balance line harmonics between the phases 16, 18, 20 and lines 106, 108; reduce low voltage problems; reduce vibration, heating, and noise of components included in the load 12, 104; allow a greater number of users for a single trunk line; and reduce voltage spikes up to 50,000 Volts.

Figure 3:
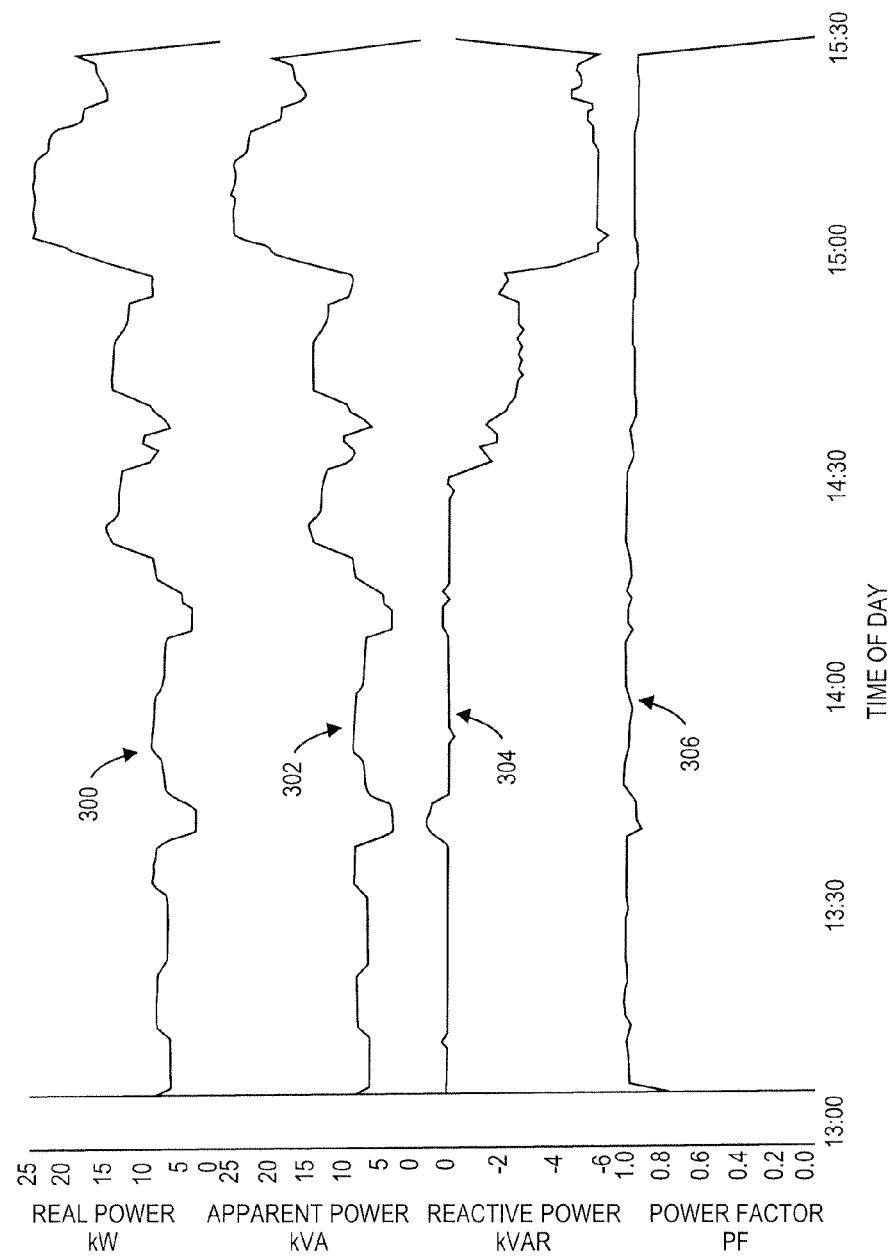
FIG. 3 is a graph of four plots of measured parameters of the FIG. 2 embodiment of the system implemented at a residence.

To illustrate the performance of the system 100, applicant implemented the system 100 at a residence and measured various power parameters both with the system 100 operating and with the system 100 not operating. The results of the measurement are shown in FIG. 3. With the system 100 implemented between the electric power supply 102 and the load 104, the real power, the apparent power, the reactive power, and the power factor were measured in the vicinity of the system 100 at regular intervals on a particular day. A first plot 300 shows the real power measured in kiloWatts (kW) vs. the time of day (in military time). A second plot 302 shows the apparent power measured in kiloVoltAmps (kVA) vs. time of day. A third plot 304 shows the reactive power measured in kiloVoltAmps Reactive (kVAR) vs. time of day. A fourth plot 306 shows the power factor (in a range from approximately zero to approximately one) vs. time of day.

As seen in FIG. 3, from the time of approximately 13:00 until approximately 14:30, the system 100 was in operation. The magnitudes of the real power and the apparent power reflected the activity of various loads 104. The reactive power averaged approximately 0 kVAR and the power factor averaged approximately 1. At around 14:30, the system 100 was decoupled from the electric power supply 102 and the load 104. The magnitudes of the real power and the apparent power increased. The magnitude of the reactive power increased in the negative direction, and the power factor averaged at a value less than 1. Thus, with the system 100 not implemented between the electric power supply 102 and the load 104, the load 104 consumed greater real power, apparent power, and reactive power. Furthermore, the power factor reduced to less than 1.

Although the invention has been described with reference to the embodiments illustrated in the attached drawing figures, it is noted that equivalents may be employed and substitutions made herein without departing from the scope of the invention as recited in the claims.

The invention claimed is:

1. A system for conditioning a three phase alternating current electric power, including a first phase, a second phase, a third phase, and a neutral line, supplied to a load, the system comprising:
   a plurality of first surge arresters configured to minimize an amount by which the voltage between two phases and the neutral line exceeds a rated value, each first surge arrester including a first terminal connected to the first phase, a second terminal connected to the second phase, and a third terminal connected to the neutral line;
   a plurality of second surge arresters configured to minimize an amount by which the voltage between two phases and the neutral line exceeds the rated value, each second surge arrester including a first terminal connected to the second phase, a second terminal connected to the third phase, and a third terminal connected to the neutral line;
   a plurality of third surge arresters configured to minimize an amount by which the voltage between two phases and the neutral line exceeds the rated value, each third surge arrester including a first terminal connected to the first phase, a second terminal connected to the third phase, and a third terminal connected to the neutral line; and
   a plurality of capacitors configured to minimize an amount by which the voltage between two phases falls below the rated value and including a first capacitor with a first terminal connected to the first phase and a second terminal connected to the second phase, a second capacitor with a first terminal connected to the second phase and a second terminal connected to the third phase, and a third capacitor with a first terminal connected to the first phase and a second terminal connected to the third phase.

2. The system of claim 1, wherein each of the first surge arresters includes an electric current rating, such that the number of first surge arresters is related to the electric current requirement of the load divided by the electric current rating.

3. The system of claim 1, wherein each of the second surge arresters includes an electric current rating, such that the number of second surge arresters is related to the electric current requirement of the load divided by the electric current rating.

4. The system of claim 1, wherein each of the third surge arresters includes an electric current rating, such that the number of third surge arresters is related to the electric current requirement of the load divided by the electric current rating.

5. The system of claim 1, further comprising a three phase surge suppressor configured to minimize an amount by which the voltage between the three phases and the neutral line exceeds the rated value, the surge suppressor coupled to the first phase, the second phase, the third phase, and the neutral line.

6. The system of claim 5, wherein the first surge arresters, the second surge arresters, the third surge arresters, and the three phase surge suppressor are passive.

7. The system of claim 5, wherein the three phase surge suppressor presents a low impedance to the neutral line when either the first phase, the second phase, or the third phase exceeds the rated value.

8. The system of claim 1, wherein the first surge arresters present a low impedance to the neutral line when either the first phase or the second phase exceeds the rated value.

9. The system of claim 1, wherein the second surge arresters present a low impedance to the neutral line when either the second phase or the third phase exceeds the rated value.

10. The system of claim 1, wherein the third surge arresters present a low impedance to the neutral line when either the third phase or the first phase exceeds the rated value.

11. A system for conditioning a three phase alternating current electric power, including a first phase, a second phase, a third phase, and a neutral line, supplied to a load, the system comprising:
   a plurality of first surge arresters including a first terminal connected to the first phase, a second terminal connected to the second phase, and a third terminal connected to the neutral line and configured to minimize the amount by which the voltage between two phases and the neutral line exceeds a rated value by presenting a low impedance to the neutral line when either the first phase or the second phase exceeds the rated value;
   a plurality of second surge arresters including a first terminal connected to the second phase, a second terminal connected to the third phase, and a third terminal connected to the neutral line and configured to minimize an amount by which the voltage between two phases and the neutral line exceeds a rated value by presenting the low impedance to the neutral line when either the second phase or the third phase exceeds the rated value;

a plurality of third surge arresters including a first terminal connected to the first phase, a second terminal connected to the third phase, and a third terminal connected to the neutral line and configured to minimize an amount by which the voltage between two phases and the neutral line exceeds a rated value by presenting the low impedance to the neutral line when either the third phase or the first phase exceeds the rated value; and a plurality of capacitors configured to minimize an amount by which the voltage between two phases falls below the rated value and including a first capacitor with a first terminal connected to the first phase and a second teiininal connected to the second phase, a second capacitor with a first terminal connected to the second phase and a second terminal connected to the third phase, and a third capacitor with a first terminal connected to the first phase and a second terminal connected to the third phase.

12. The system of claim 11, wherein each of the first surge arresters includes an electric current rating, such that the number of first surge arresters is related to the electric current requirement of the load divided by the electric current rating.

13. The system of claim 11, wherein each of the second surge arresters includes an electric current rating, such that the number of second surge arresters is related to the electric current requirement of the load divided by the electric current rating.

14. The system of claim 11, wherein each of the third surge arresters includes an electric current rating, such that the number of third surge arresters is related to the electric current requirement of the load divided by the electric current rating.

15. The system of claim 11, further comprising a three phase surge suppressor coupled to the first phase, the second phase, the third phase, and the neutral line and configured to minimize an amount by which the voltage between the three phases and the neutral line exceeds a rated value by presenting the low impedance to the neutral line when either the first phase, the second phase, or the third phase exceeds the rated value.

16. The system of claim 15, wherein the first surge arresters, the second surge arresters, the third surge arresters, and the three phase surge suppressor are passive.

\* \* \* \* \*